Patented Aug. 25, 1953

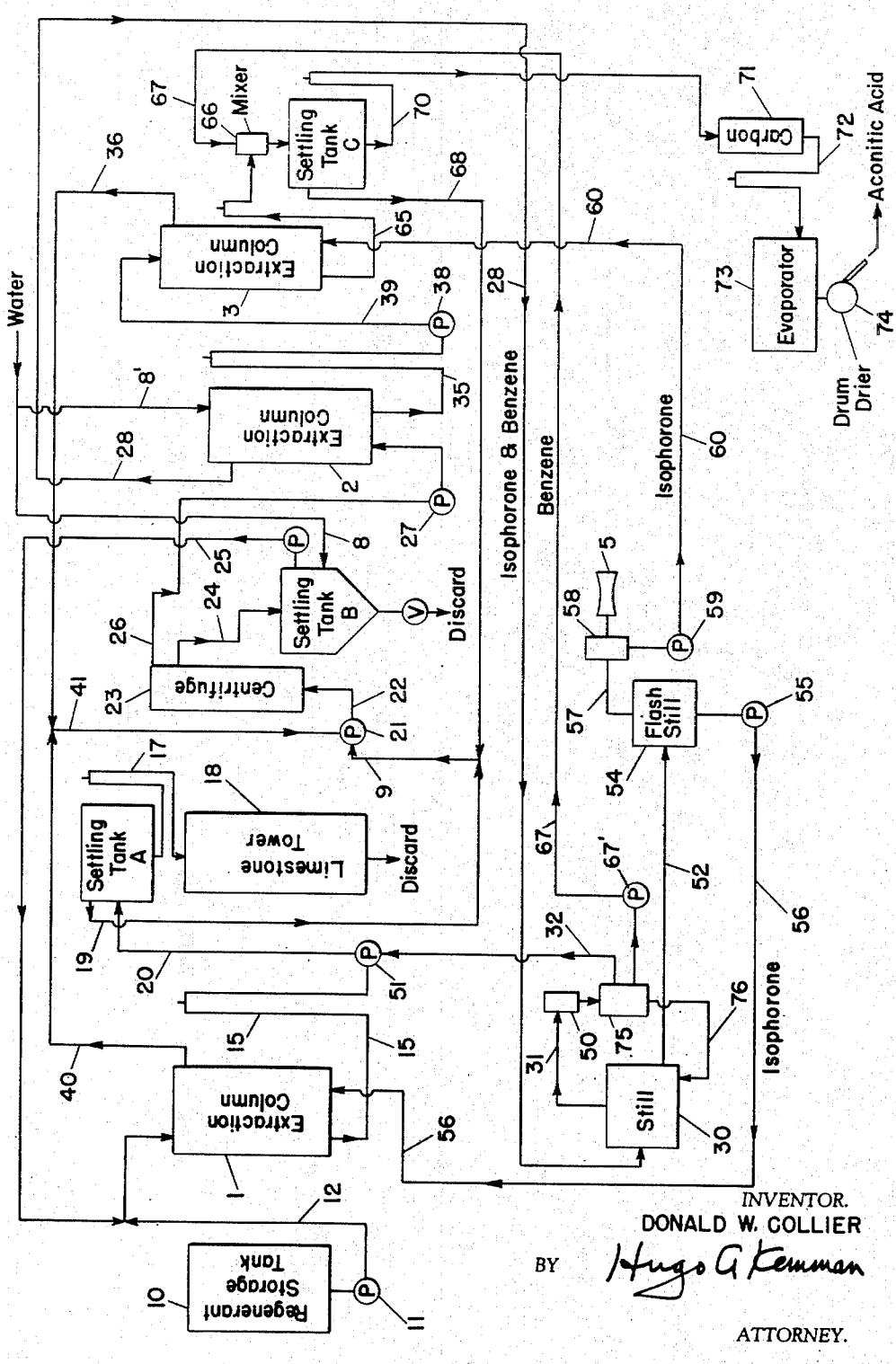

2,650,248

UNITED STATES PATENT OFFICE 2,650,248

CONCENTRATION OF AQUEOUS ACONITIC ACID SOLUTIONS

Donald W. Collier, Philadelphia, Pa., assignor to The Sharples Corporation, a corporation of Delaware Application March 15, 1950, Serial No. 149,864

6 Claims. (Cl. 260—537)

This invention relates to a process and apparatus for the recovery of substances from relatively dilute solutions thereof. More specifically, the invention relates to the recovery of aconitic acid from relatively dilute aqueous solutions containing impurities and foreign substances by contacting the aqueous solution with an organic solvent to form two phases in which the aconitic acid is concentrated in the non-aqueous phase, thereafter adding hydrocarbon type solvent to the non-aqueous phase which is miscible therewith and then contacting the mixed non-aqueous phase with a small volume of water to form two phases in which the aconitic acid is concentrated in the aqueous phase.

According to my invention I provide a system and method for continuously recovering a substance, such as aconitic acid, without substantial loss of the organic solvents used by providing for the cyclic recovery of the solvents in my system and contacting the stream of aqueous solution with a counter-current stream of a substantially water-immiscible organic solvent in a plurality of stages. The concentration of the substance, such as aconitic acid, is increased in a double extraction system by virtue of the change in its distribution tendency between water and an organic phase brought about by the addition of the hydrocarbon type solvent to the organic phase containing the aconitic acid so that the final aqueous solution issuing from my system is of a greater concentration as compared with the untreated aqueous solution fed to the system.

Aconitic acid is found in substantial amounts in blackstrap molasses and sorgo juices in amounts as high as 5% by weight of solids. The aconitic acid can be separated from the molasses by an anion-exchange material which is then treated to produce an aqueous solution of aconitic acid containing other impurities such as mineral acids, organic substances, and coloring matters derived from the molasses. According to my invention such solution of aconitic acid is extracted with a suitable organic solvent, such as isophorone, and the extracted solution is further treated to isolate substantially pure aconitic acid.

Further features and advantages of my invention will be evident from the following illustrative embodiment of my invention in connection with the accompanying drawing. A solution containing aconitic acid to be treated in accordance with my invention may, for example, be produced in accordance with the method disclosed in my copending application, Serial No. 149,863, filed March 15, 1950. According to an embodiment of this method the blackstrap molasses of about 85° Brix is suitably diluted with water to about 50° Brix and is heated to about 50° C. Blackstrap molasses is the by-product of raw sugar manufacture. It is a heavy viscous liquid separated from the final low grade massecuite from which no further sugar can be crystallized by the usual methods. The density of blackstrap molasses ranges from 85° to 92° Brix, containing total solids by drying of 77 to 84%. The sucrose content varies by weight between 25 and 40% and the reducing sugars from 30 to 12% with total sugars about 50%. It contains anywhere from 0.5 to 5% on Brix of aconitic acid and small amounts of other organic acids such as succinic acid and oxalic acid, and also substantial amounts of mineral salts such as the chlorides, sulfates and phosphates of potassium, calcium, magnesium and sodium. The molasses liquor is treated in a three-stage counter-current manner, for example, with an anion exchange resin containing adsorbed sulfuric acid. This resin may be Ionac A-300, sold by American Cyanamid Company, New York, N. Y., which is an aliphatic amine phenol-formaldehyde resin. As an illustration, if the molasses contains about 2.4% aconitic acid on Brix, the dry base regenerated weight of the resin used is conveniently about 7% of the weight of the diluted molasses. Lime is added to the stage in which the anion exchanger first contacts the molasses to adjust the pH within a pH range of about 4 to about 6 and preferably to about 5.0, the point at which the selectivity of the exchanger for aconitic acid over mineral acids is at a maximum. Reference is made to co-pending application Serial No. 150,548, filed March 18, 1950, by Hugh G. Bryce wherein such procedure is described and claimed. Each stage comprises a steel treating tank with agitator which can be heated with live steam to maintain the temperature of about 50° C. Separation of molasses and anion exchange resin between stages is accomplished by the use of vibrating screens. The molasses solution leaving the third stage is passed through a centrifuge to remove the calcium sulfate which is formed during the treat. This calcium sulfate is dropped into a settling tank filled with water, to dissolve the adhering molasses from the solid. The sweet water may be then used in diluting the treated molasses further to prepare it for fermentation, if desired, while the solids are discarded through a valve in the bottom of the tank, which is operated periodically.

The exchange resin, having passed through the three stages, is washed on a vibrating screen to remove the adhering molasses and is dropped into the regeneration tank. The sweet water resulting from the wash is used in diluting the raw molasses. The pH in the regeneration tank is maintained at about 0.9 and not exceeding 2.0, by continuous addition of $H_2SO_4$. The mixture of resin and regenerant solution which now contains most of the aconitic acid that was on the resin is separated on a vibrating screen and the exchange resin is washed counter-currently in three stages on a vibrating screen to remove the remainder of the aconitic acid and some of the sulfuric from the resin. The resin is now ready to be reused in the counter-current adsorption train. The wash-water is used as make-up water in the regeneration tank.

The regenerant solution separated from the exchanger on a vibrating screen, is then subjected to purification and recovery in accordance with the procedure of the present invention.

Referring to the drawing, the raw aqueous solution containing say about 2.3% aconitic acid and impurities, as produced for example in accordance with the method previously described, is stored in a storage tank 10 from which it is fed at a controlled rate by pump 11 and line 12 to the top of an extraction column 1, preferably of the type which is internally agitated and provided with say ten plates. A stream of isophorone is fed by line 56 to the bottom of the extraction column 1 in counter-current flow, preferably at a rate 0.3 that of the aqueous feed rate. This treatment strips aconitic acid and some impurities from the aqueous solution, leaving behind the stripped residual aqueous solution containing some sulfuric acid, a small amount of isophorone and other impurities. The stream of isophorone leaves the top of the extraction column 1 through line 40 and enters line 41. In extraction columns, such as columns 1, 2 and 3, a disengaging section is present in the top of the column to allow the up-flowing organic phase to coagulate into a substantially water-free phase so that it may be withdrawn from the column as such. The water feed to the top of the column is placed below the take-off of the organic phase and as a result an interface forms between the aqueous phase being fed into the column and the coagulated organic phase being withdrawn from the top of the column. The aqueous stream is removed from the bottom of the extraction column 1 at such a rate as to keep the level of the interface of the isophorone and water solution at a constant height above the bottom of the column. This can be accomplished by causing the stream to flow through an external vented overflow line 15, the height of which controls the height of the interface. The stripped residual aqueous solution is removed from the bottom of the extraction column through line 15 to a settling tank A to separate out any isophorone present in the solution. The stripped residual aqueous phase in settling tank A is removed through line 17 to a tower 18 containing lump limestone which neutralizes the sulfuric acid in the solution so that the aqueous stream may be safely discarded. Benzene at a volume rate about 0.6 that of the aqueous stream is fed into pump 51 to mix with the stripped aqueous stream in line 20 where the mixture is conducted to settling tank A to separate into two phases. The benzene serves to remove any isophorone dissolved in the stripped aqueous solution. The mixture of isophorone and benzene separated in settling tank A is fed by line 19 and mixed in line 9 with a similar mixture of benzene and isophorone and finally mixed in pump 21 and line 22 with the isophorone stream from column 1. The amount of benzene used is regulated to be about 1.5 times the volume of isophorone flowing through line 41, to a centrifuge 23. The addition of benzene results in the formation of a small amount of a second phase of tarry liquid which is conveyed in the stream of isophorone and benzene and fed to centrifuge 23. This separation may be accomplished in a settling tank instead of a centrifuge. The tarry phase is separated by the centrifuge and is fed by line 24 to a settling tank B through which a water stream flows supplied by line 8.

The aqueous phase from tank B, containing some water-soluble impurities and a small amount of aconitic acid is fed to line 25 to join the stream in line 12 fed from the storage tank 10. As the tarry phase fed to settling tank B contacts the water therein it solidifies and is discharged periodically from the bottom of the settling tank B and is discarded.

The main stream of clarified isophorone and benzene coming from the centrifuge 23 is fed by line 26 and pump 27 to the bottom of extraction column 2 which is preferably a five plate internally agitated column. Water is fed to the top of column 2 by line 8' in counter-current flow at a volume rate ½ of that of the organic stream. The presence of benzene in the isophorone now causes the aconitic acid to go back into solution in the water and as a result of the favorable distribution constants in both extractions, the concentration of the aconitic acid is now over 10% which represents an increase of about 4.5 times the concentration in the original solution.

The extracted stream of mixed isophorone and benzene is now fed by line 28 to a still 30 where the benzene is stripped from it by a steam distillation. The still 30 may be of any suitable construction. It may, for example, comprise a pot and a three plate column. Sufficient water is added to keep the pot temperature at about 100° C. to prevent deterioration of the isophorone which occurs at high temperatures. The benzene separated from isophorone in the still is fed through line 31 to a condenser 50. The liquid benzene decanted in decanter 75 from the water which also condenses in condenser 50 can then be supplied through line 32, pump 51 and line 20 to settling tank A as previously described where it again enters the system to start another cycle. The water from decanter 75 may be recycled to the still through line 76 to maintain the steam distillation. The hot isophorone separated in the still 30 is fed by line 52 to a flash still 54 which is maintained at a vacuum of about 10 mm. Hg by means of a steam injector 5. The isophorone recovered from the bottom of still 54 is fed by pump 55 and through line 56 back to the extraction column 1 for reuse in another cycle. A small amount of isophorone is vaporized in the flash still and is fed through line 57 to condenser 58. The condensed isophorone is fed by pump 59 through line 60 to the extraction column 3. The degree of vacuum in the flash still is controlled through a regulated air bleed so that sufficient isophorone vaporizes to supply the extraction column 3. Column 3 is supplied with isophorone which has been distilled to ensure that the isophorone being fed will contain no dissolved solids.

The aqueous phase now containing about 10% by weight of aconitic acid which is separated from extraction column 2 is fed through line 35, pump 38 and line 39 to the top of extraction column 3. As previously stated the distilled stream of isophorone from the flash still 54 is fed to the bottom of the column 3, which may be a spray type or packed column containing three stages, by line 60 at a volume rate of 0.1 that of the aqueous feed in counter-current flow to the aqueous stream. A large fraction of the remaining impurities in the aqueous stream is removed from the solution along with only a small fraction of the aconitic acid. The solvent stream of isophorone containing the impurities is removed through line 36 and is fed into line 41 where it combines with the stream of isophorone containing aconitic acid coming from extraction column 1, and the combined streams are mixed with benzene in pump 21 and fed to centrifuge 23 to remove any tarry phase as previously described.

The aqueous phase separated from column 3 containing the concentrated solution of aconitic acid is fed through line 65 to a mixer 66 where it is mixed with a stream of benzene supplied from the decanter 75, pump 67' and line 67. The volume of benzene is about 0.6 that of the aqueous stream. The benzene dissolves any isophorone in the aqueous solution.

The mixture is fed to a settling tank C where the benzene containing dissolved isophorone is separated and fed through line 68, then through line 9 where it joins the stream of isophorone and benzene from settling tank A. The combined streams of isophorone and benzene are fed by pump 21 through line 22 to centrifuge 23.

The aqueous phase separated in settling tank C is passed through line 70 to a tower 71 containing granular activated carbon where the remaining small amounts of impurities in the solution are removed from the stream. I may provide two carbon towers so that while one is in use the other may be recharged with fresh carbon.

The aqueous stream is now completely purified and contains about 10% by weight of aconitic acid. The solution is fed by line 72 and is evaporated to a slurry of aconitic acid in water in an evaporator-crystallizer 73 operated at atmospheric pressure. The slurry is then fed on an atmospheric drum drier 74, yielding a dry white product of substantially pure aconitic acid.

The operation of the process as described can be carried out with great efficiency and at comparatively low cost because the organic solvents used are recovered and reused in the process. It will be noted that a suitable head is maintained in the various columns and tanks by having the outflow lines arranged in suitable reentrant or U-shaped courses vented at the top to provide external overflow lines, the height of which controls the height of the interface of the two phases in each adjacent column or tank, such as the line 15 adjacent extraction column 1, line 17 adjacent settling tank A, line 35 adjacent extraction column 2 and line 70 adjacent settling tank C. The system is simple to operate and control at all points.

Instead of benzene, I may employ hexane, toluene, carbon tetrachloride or other similar non-polar organic compounds which are miscible with the aforenamed polar organic compound and are relatively immiscible with water.

The criterion of selection of polar organic solvent in order to permit a concentration of aconitic acid to be accomplished by a two-step extraction process, such as illustrated with isophorone and benzene, is relatively simple and can be related to the distribution coefficients for aconitic acid between the aqueous and two organic phases concerned. When a substance is dissolved in a system of two immiscible liquids, $a$ and $b$, it will distribute itself between the two phases and the ratio of the concentrations in the two phases at equilibrium is defined as the distribution coefficient as follows: $K = C_a/C_b$. For reasonably immiscible liquids this distribution coefficient is relatively constant over fairly large concentration ranges of the substance in the two given liquids.

For such systems, if the liquid $b$ initially containing all of the substance to be extracted is counter-currently contacted with liquid $a$ it can be shown that the substance can be substantially completely transferred into $a$ if $$\frac{KA}{B} \geq 1$$

where A and B are the volume flows of liquids $a$ and $b$. Thus in any two-step extraction system such as described previously, aconitic acid at concentration $C_0$ in an aqueous solution is first contacted counter-currently with a polar organic solvent with the respective flow rates being $W_1$ and $P$. The organic solvent now containing the aconitic acid is mixed with a non-polar organic solvent at flow rate of $N$ for said non-polar solvent, and this mixture is counter-currently contacted in a second step with water at flow rate of $W_2$ to produce a final aconitic acid concentration in $W_2$ of $C_f$. If the aconitic acid is substantially completely transferred in each of the two extractions then:

$$C_f = C_0 \left(\frac{W_1}{P}\right)\left(\frac{P}{P+N}\right)\left(\frac{P+N}{W_2}\right) \quad (1)$$

Furthermore, if the aconitic acid is to be substantially completely transferred in each of the two steps then at least:

$$\frac{K_1 P}{W_1} = 1 \text{ and } \frac{W_2}{K_2(P+N)} = 1 \quad (2)$$

where $K_1$ and $K_2$ are the distribution coefficients for aconitic acid between water and the polar and mixed polar-non-polar organic phases, respectively, as follows:

$$K_1 = C_p/C_w \text{ and } K_2 = C_{p+n}/C_w \quad (3)$$

Therefore, if a concentration of aconitic acid is to occur by the process, it follows by substituting (2) into (1) that:

$$C_f/C_0 = \frac{K_1}{K_2}\left(\frac{P}{P+N}\right) > 1 \quad (4)$$

According to Equation 4 if the distribution coefficient for aconitic acid from water into a mixture of polar and non-polar solvents decreases more rapidly with addition of the non-polar solvent than does the fraction of polar solvent in the mixture, a more concentrated solution of aconitic acid can be obtained in the second water extract than existed in the initial aqueous solution by such a two-stage process. All of the polar solvents previously mentioned fulfill the condition expressed by Equation 4 when the non-polar solvent is benzene and the effect of the other non-polar solvents specified is substantially the same.

The miscibility limits for water and the organic solvents, as long as two phases are formed upon contacting, is dependent upon commercial rather than technical factors. Rather arbitrarily one might set a maximum solubility for the polar solvent in water at 30% and the non-polar solvent at 1% at room temperature.

My invention is particularly useful in obtaining relatively pure aconitic acid from dilute solutions thereof at relatively low cost. The solvents used in my process are continuously recycled and reused. The aconitic acid can be concentrated from its aqueous solutions at relatively low temperatures without requiring boiling of dilute aconitic acid solutions, thereby avoiding decomposition of the aconitic acid. Inasmuch as the aconitic acid is extracted by the solvent from an aqueous solution containing inorganic acids, the further processing of the aconitic acid can be carried out in equipment which need not be acid resistant to inorganic acids. My process also permits the recovery of the aconitic acid from the organic solvents without evaporating the polar organic solvent, thereby preventing any substantial decomposition or losses of the polar solvent.

It is to be understood that the invention is not limited to the specific materials and solvents or conditions utilized in the foregoing illustrative embodiment of my invention except as specified in the appended claims, and that modifications and variations may be adopted utilizing the essential features of my invention which are intended to be included in the appended claims.

I claim:

1. A process for purifying and concentrating aconitic acid which comprises intimately contacting an aqueous solution of aconitic acid containing impurities with isophorone with the formation of the two phases, separating said phases, intimately contacting the separated aqueous phase with a non-polar organic solvent with the formation of two phases, said non-polar organic solvent being miscible with isophorone but substantially completely immiscible with water, separating said last-mentioned phases, intimately contacting the separated isophorone phase with the separated non-polar organic solvent phase with the formation of two phases, separating said last-mentioned phases, one of said last-mentioned phases being a mixture of isophorone and non-polar organic solvent having aconitic acid dissolved therein, intimately contacting said last-mentioned phase with water with the formation of two phases, and separating said last-mentioned phases to obtain an aqueous solution containing aconitic acid in greater concentration and purity than in said original aqueous solution.

2. The process of claim 1 wherein the non-polar organic solvent is selected from the group consisting of benzene, hexane, toluene and carbon tetrachloride.

3. The process of claim 2 wherein the non-polar organic solvent is benzene.

4. A continuous process for recovering aconitic acid from a relatively dilute aqueous solution derived from molasses by anionic exchange which comprises continuously feeding a stream of said aqueous solution to an extraction stage, continuously feeding a counter-current stream of isophorone to said extraction stage to strip the aconitic acid from said solution, separating the mixed streams into two phases, then contacting the stripped aqueous phase with benzene to dissolve isophorone therefrom, separating the benzene from said aqueous phase, adding said separated benzene to the isophorone phase and then separating a tarry phase therefrom, then feeding a stream of said isophorone-benzene mixture to a second extraction stage, continuously feeding a counter-current stream of water to said second extraction stage to strip the aconitic acid from said isophorone-benzene mixture and form an aqueous solution thereof, separating the last-mentioned aqueous solution from the isophorone-benzene phase, continuously feeding a stream of said last-mentioned aqueous solution to a third extraction stage, continuously feeding a countercurrent stream of isophorone to said third extraction stage to dissolve therein impurities in said aqueous solution, separating said last-mentioned aqueous solution from said isophorone, then contacting said aqueous solution with benzene to dissolve isophorone therefrom, separating said last-mentioned benzene from said aqueous solution, thereafter passing said aqueous solution through a bed of activated carbon and thereafter evaporating said solution to obtain solid aconitic acid.

5. A continuous process for recovering aconitic acid from a relatively dilute aqueous solution derived from molasses by anionic exchange which comprises continuously feeding a stream of said aqueous solution to an extraction stage, continuously feeding a counter-current stream of isophorone to said extraction stage in proportion of about 0.3 by volume to strip the aconitic acid from said solution, separating the mixed streams into two phases, then contacting the stripped aqueous phase with benzene to dissolve isophorone therefrom, separating the benzene from said aqueous phase and adding said benzene in amount of about 0.6 by volume to the isophorone phase and separating a tarry phase therefrom, then feeding a stream of said isophorone-benzene mixture to a second extraction stage, continuously feeding a counter-current stream of water in proportion of about 0.5 by volume to said second extraction stage to strip the aconitic acid from said isophorone-benzene mixture and form an aqueous solution thereof, separating the said aqueous solution from the isophorone-benzene phase, continuously feeding a stream of said aqueous solution to a third extraction stage, continuously feeding a counter-current stream of isophorone in proportion of about 0.1 by volume to said third extraction stage to dissolve therein impurities in said aqueous solution, separating the aqueous solution from said isophorone, then contacting said aqueous solution with benzene to dissolve isophorone therefrom, separating the benzene from said aqueous solution, passing said aqueous solution through a bed of activated carbon, and thereafter evaporating said solution to obtain solid aconitic acid.

6. A continuous process for recovering aconitic acid from a relatively dilute aqueous solution derived from molasses by anionic exchange which comprises continuously feeding a stream of said aqueous solution to an extraction stage, continuously feeding a counter-current stream of isophorone to said extraction stage to strip the aconitic acid from said solution, separating the mixed streams into an aqueous phase and a non-aqueous phase comprising isophorone having aconitic acid dissolved therein, then contacting the stripped aqueous phase with benzene to dissolve isophorone therefrom, separating the benzene from said aqueous phase, thereafter neutralizing acid in the aqueous phase and discarding same, adding said separated benzene to the separated isophorone phase and separating a tarry phase therefrom, then feeding a stream of the resulting isophorone benzene phase to a second extraction stage, continuously feeding a counter-current stream of water to said second extraction stage to strip out the aconitic acid from said isophorone-benzene phase and form an aqueous solution thereof, separating the last-mentioned aqueous solution from the isophorone-benzene phase, thereafter distilling said isophorone-benzene phase to separate the isophorone and benzene, feeding the last-mentioned separated isophorone to said first extraction stage and feeding the last-mentioned separated benzene to the aqueous phase flowing from the said first extraction stage, continuously feeding a stream of the aqueous phase from the second extraction stage to a third extraction stage, continuously feeding a counter-current stream of isophorone to said third extraction stage to dissolve impurities from said aqueous solution, separating said last-mentioned isophorone from the aqueous phase and feeding said last-mentioned separated isophorone into said isophorone-benzene phase, then contacting the aqueous phase separated from the third extraction stage with benzene to dissolve isophorone therefrom, separating said last-mentioned benzene from said last-mentioned aqueous solution and feeding said last-mentioned benzene into said isophorone-benzene phase, and passing said last-named aqueous solution through a bed of activated carbon and evaporating said solution to recover aconitic acid.

DONALD W. COLLIER.

References Cited in the file of this patent

UNITED STATES PATENTS

| Number | Name | Date |
|---|---|---|
| 1,952,845 | Dreyfus | Mar. 27, 1934 |
| 2,076,126 | Guinot | Apr. 6, 1937 |
| 2,165,438 | Allquist | July 11, 1939 |
| 2,526,508 | Scheeline et al. | Oct. 17, 1950 |

OTHER REFERENCES

McClure: "Chem. Eng. News," vol. 22, pp. 416–421 (1944).